UNITED STATES PATENT OFFICE.

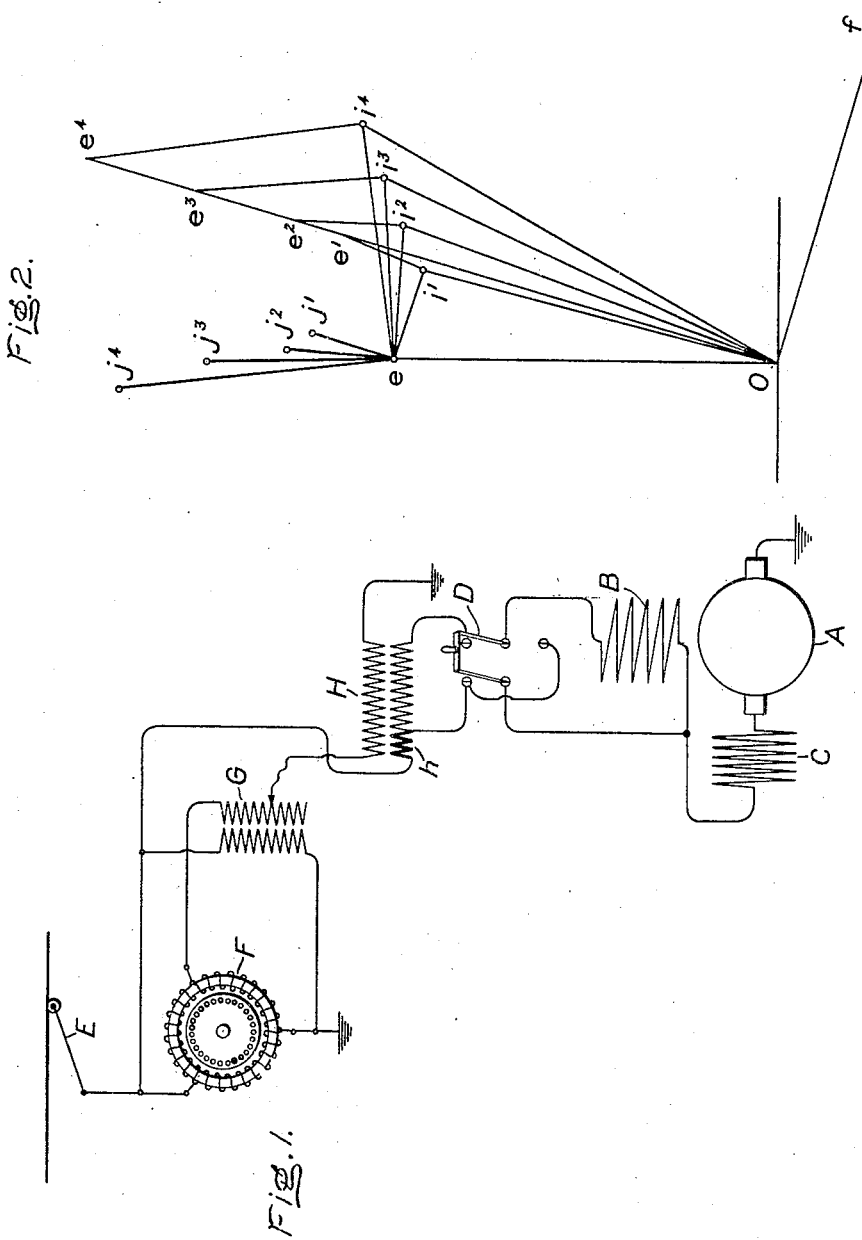

ERNST F. W. ALEXANDERSON, OF SCHENECTADY, NEW YORK, ASSIGNOR TO GENERAL ELECTRIC COMPANY, A CORPORATION OF NEW YORK.

BRAKING ALTERNATING-CURRENT MOTORS.

967,295.

Specification of Letters Patent.   Patented Aug. 16, 1910.

Application filed June 4, 1906.   Serial No. 320,046.

*To all whom it may concern:*

Be it known that I, ERNST F. W. ALEXANDERSON, a subject of the King of Sweden, residing at Schenectady, county of Schenectady, State of New York, have invented certain new and useful Improvements in Braking Alternating-Current Motors, of which the following is a specification.

My invention relates to the control of alternating-current motors of the commutator type, and its object is to provide an efficient arrangement for braking such motors.

The method of braking direct-current motors by connecting the field in shunt to the armature is well known in the art, but this simple connection will not suffice for braking alternating-current motors, since the current in the motor field, being entirely inductive, will lag nearly ninety degrees behind the impressed voltage, and consequently the induced armature voltage will be practically ninety degrees out of phase with the line-voltage. With such a phase-relation obviously no power can be returned to the line. If a voltage substantially 90° out of phase with the voltage at the source is impressed on the field it produces a current in the field substantially in phase with or in opposition to the voltage at the source, so that the induced armature voltage may practically be in opposition to the voltage at the source. In this manner ideal conditions for no load may be obtained,—that is, with the induced armature voltage equal and opposite to the voltage of the source, so that no current flows; but when the armature voltage is raised without shifting its phase in order to return energy to the line, the current that flows is so nearly wattless that very little energy is in fact returned. The reason for this is that the reactance of the armature circuit of the motor is very much greater than its resistance, so that the current lags by a large angle behind the electromotive force. For instance, assume that the impedance of the armature circuit is entirely reactance; then if the armature voltage is in opposition in phase to the line-voltage, and is increased in amount slightly above the line-voltage, the resultant voltage will be in phase with the line voltage, but the current which will flow will be ninety degrees out of phase with the resultant voltage, and consequently ninety degrees out of phase with the line-voltage. In other words, this current will be wholly wattless and will return no energy to the line.

In order that the current may be nearly all energy-current, so that the braking is efficient, it is essential that the resultant voltage, produced by the line-voltage and induced armature-voltage as components, should be substantially ninety degrees out of phase with the line voltage. With such a phase-relation, the current, lagging ninety degrees behind the resultant voltage, will be in phase with the line-voltage, and consequently will be an energy-current. Obviously, the induced armature voltage must be varied in order to vary the braking effect; but if the resultant voltage is to be maintained at all times ninety degrees out of phase with the line-voltage, it is evident that the induced armature-voltage must vary simultaneously in amount and in phase, so at all times the line-voltage, the induced armature-voltage, and the resultant voltage, will form a rightangle triangle, of which the line-voltage is the base and is constant, while the induced armature-voltage is the hypotenuse and varies in amount and in position so as to vary the third side of the triangle, which is the resultant voltage and to which the braking effect is proportional.

My invention, accordingly, consists in supplying to the field of the motor a current of proper phase and magnitude to induce in the armature a voltage which, with the voltage of the source, produces a resultant voltage substantially ninety degrees out of phase with the voltage of the source, and further consists in maintaining the phase of the resultant voltage substantially constant, while varying the phase and amount of the induced armature-voltage to vary the braking effect.

My invention will best be understood by reference to the accompanying drawings, in which—

Figure 1 shows diagrammatically an alternating-current motor of the commutator type arranged for braking in accordance with my invention; and Fig. 2 is a diagram of the phase relations of the electromotive forces.

In the drawings A represents the armature, B the field winding, and C the compensating winding of a compensated series motor. I have selected this type of motor merely for the purpose of illustration, and it will be understood that my invention is equally applicable to any other commutator type of alternating-current motor. A controlling switch D is arranged to connect the motor either for operation as a motor for driving the load or for braking. When switch D is thrown to its lower position, the motor-armature, compensating winding, and field winding are connected all in series to the source of current indicated by the trolley E.

F represents a phase-shifting transformer, which may be of any desired type, and which is represented as a small single-phase induction motor with a short-circuited secondary of the squirrel-cage type running free. Leads are brought out from the primary winding as for a three-phase motor. Two of these leads are connected across the source of voltage, while the third lead is connected through the secondary of a transformer G and through the primary of the transformer H to ground. The potential impressed upon the primary of transformer H, neglecting the effect of the transformer G, would be substantially ninety degrees out of phase with the voltage of the source. Transformer G is inserted merely for the purpose of adjusting the phase of this voltage. This transformer, which supplies a component voltage in phase with the voltage of the source, may be employed to shift the phase of the voltage impressed upon the primary of transformer H, so as to reduce its displacement somewhat below ninety degrees from the phase of the voltage of the source. This phase adjustment is for the purpose of varying the braking effect, as will be hereafter explained, and might equally well be obtained by shifting the terminal connections of the phase-shifting transformer F, if desired.

The secondary winding of transformer H is arranged to be connected to the field winding B when switch D is thrown into braking position. In this braking position the armature A and compensating winding C are connected directly across the line, while the field winding B is connected to the secondary of transformer H; the primary of which is placed in a circuit in shunt to the motor armature, and thus furnishes a shunt excitation to the field. The field winding is thus connected in shunt to the armature through the phase-controlling transformers. A few turns $h$ in series with the armature are placed on the core of transformer H. These turns furnish a series excitation and are arranged to oppose the primary winding of the transformer.

The operation of the apparatus shown in Fig. 1 will best be understood by reference to Fig. 2. In this figure $Oe$ represents the line-voltage, which is constant in phase and in amount. $Of$ represents the phase of the voltage impressed upon the field winding B, due to the current in the primary winding of transformer H. This voltage, which is in phase with, or rather in opposition to, the voltage impressed on the primary of transformer H, is substantially ninety degrees out of phase with the line $Oe$, representing the voltage of the source. The field-current due to this voltage $Of$ lags ninety degrees behind this voltage, and may be represented in phase by the line $Oe^4$, which, consequently, represents the phase of the shunt excitation. The induced armature-voltage due to this shunt excitation is in phase with it, and consequently may be represented in phase by the same line $Oe^4$. With a given adjustment of the transformer G the shunt excitation through field winding B is constant, both in phase and amount, and consequently the induced armature-voltage due to the shunt excitation will be constant in phase, but will vary in amount with the speed. The series turns $h$ produce a series excitation, or in other words, a second component of the field-current, which is in phase with the armature-current. If, for a given speed of the armature, the induced voltage due to the shunt excitation is equal to $Oe^2$, and if the armature-current is represented in phase and in amount by the line $e^2 i^2$, then this line may also represent the series excitation of the motor opposing the shunt excitation so that the resultant induced armature-voltage is represented by the line $Oi^2$. The two component voltages $Oe$ and $Oi^2$, representing respectively the voltage of the source and the induced armature voltage, give a resultant voltage $e\ i^2$, and this resultant voltage produces a current which, owing to the inductance of the motor circuit, lags substantially ninety degrees behind this voltage, and may be represented in amount and phase by the line $ej^2$. This line is, of course, equal and parallel to the line $i^2 e^2$. It will be seen that this current is substantially in phase with the line-voltage $Oe$, and is consequently an energy-current. Now, if the speed of the motor should change,—for instance, increasing from the speed represented by $Oe^2$ to the speed represented by $Oe^3$, it will be seen that the first effect would be to shift the position of the line $e\ i^2$, changing the phase of the current returned to the source; but this change of phase of the current and consequently of the series excitation increases the amount of the resultant voltage $e\ i^2$, which also increases the amount of current returned to the line. This increased current consequently increases the series excitation, which is not only increased, but also shifted somewhat in phase. This increased series excitation may be indicated in phase and amount by the line $e^3$ $i^3$, giving an induced armature-voltage represented by the line $Oi^3$. This induced armature-voltage, with the voltage of the source, produces the resultant voltage $e$ $i^3$, which produces the current $e$ $j^3$. Thus, the increase in the series excitation due to the increase in speed tends to oppose the increase in amount of the induced armature-voltage, and instead produces a change in its phase; and by properly calculating the series turns the amount and phase of the induced armature voltage may be caused to vary in such proportions that the points $i^1$, $i^2$, and $i^3$, etc., will lie along a line practically at right-angles to the line $Oe$, which means that the resultant voltage $e$ $i^1$ $ei^2$, etc., will increase in amount with varying speed, but will remain substantially constant in phase. Therefore, the current returned to the line will remain constant in phase, but will vary with the speed so as to give a stable and efficient braking effect.

The above discussion has assumed that the phase of the voltage impressed on the primary of transformer H has remained constant. Obviously, if it is desired to vary the braking effect, to adapt the motor for different grades, for instance, in the case of a railway motor, the phase of the shunt excitation should be varied, the amount being varied only sufficiently to keep the rectangular relation between the resultant voltage and the line-voltage, it is evident that the adjustment of the transformer G will give precisely the desired variation. This transformer G may be manually controlled, thereby enabling the braking effect to be varied at will; and for each adjustment of the transformer G the series turns $h$ will automatically maintain the proper phase relation of the resultant voltage for different speeds of the motor. Consequently, such an arrangement as described will give efficient braking under all conditions.

It may be noted that if the voltage impressed on the primary of transformer H were maintained absolutely constant, the series turns $h$ could not affect the amount or phase of the field current taken from the secondary of the transformer; but the primary of transformer H is excited through the phase converter F, which is made as small as possible, and with high reactance and consequently poor regulation; so that the voltage supplied thereby has enough flexibility to be varied the desired amount by the effect of the series turns in the transformer H.

I have illustrated and described my invention as applied to a single motor. Obviously, it may be applied to any number of motors, and any desired means for producing the proper phase-displacement of the shunt excitation for braking may be employed, and with any desired arrangement of controlling switches.

While I have described my invention with particular reference to controlling the phase of the field excitation of an alternating-current motor connected in shunt for braking purposes, it is obvious that my invention in certain of its aspects is equally applicable to maintaining the proper phase relation of field magnetization to armature current in any shunt-connected alternating-current motor of the commutator type, whether this connection is employed simply for braking or for ordinary operation. In either case the series excitation which I have described and illustrated produces a stable condition of proper phase relation under varying loads.

When I speak, in the appended claims, of connecting the armature to the source, I do not mean that the armature is necessarily connected directly to the source, or that it is the only one of the motor windings connected to the source; but I intend simply to state the essential fact that the armature in which the energy is generated is connected to the source to which the energy is to be returned, in any suitable manner for enabling the transfer of energy to be made.

What I claim as new, and desire to secure by Letters Patent of the United States, is,—

1. The method of braking an alternating-current motor of the commutator type which consists in connecting the armature to the source and impressing on the field of the motor a voltage displaced in phase substantially ninety degrees from the voltage of the source and controlling the phase of said impressed voltage to vary the braking effect.

2. The method of braking an alternating-current motor of the commutator type which consists in connecting the armature to the source, and connecting the field in shunt to the armature through a phase-shifting device adapted to shift the phase of the voltage impressed on the field substantially ninety degrees from the voltage of the source, and controlling the phase of the voltage impressed on the field to vary the braking effect.

3. The method of braking an alternating-current motor of the commutator type which consists in connecting the armature to the source and supplying to the field a current of the proper phase and magnitude to induce in the armature a voltage, which, with the voltage of the source, produces a resultant voltage substantially ninety degrees out of phase with the voltage of the source.

4. The method of braking an alternating-current motor of the commutator type which consists in connecting the armature to the source and supplying to the field a current of proper phase and magnitude to induce in the armature a voltage, which, with the voltage of the source, produces a resultant voltage substantially ninety degrees out of phase with the voltage of the source and maintaining the phase of said resultant voltage substantially constant for varying braking loads.

5. The method of braking an alternating-current motor of the commutator type which consists in connecting the armature to the source and supplying to the field a current of the proper phase and magnitude to induce in the armature a voltage, which, with the voltage of the source, produces a resultant voltage substantially ninety degrees out of phase with the voltage of the source and maintaining the phase of said resultant voltage substantially constant while varying the phase and amount of the induced armature voltage to vary the braking effect.

6. In combination, an alternating-current motor of the commutator type, a source of current therefor, and means for connecting the motor armature to the source, means for impressing on the motor field a voltage substantially ninety degrees out of phase with the voltage of the source to brake the motor, and means for controlling the voltage impressed on the field.

7. In combination, an alternating-current motor of the commutator type, a source of current therefor, and means for connecting the motor armature to the source, means for impressing on the motor field a voltage substantially ninety degrees out of phase with the voltage of the source to brake the motor, and means for controlling the amount and phase of the voltage impressed on the field.

8. In combination, an alternating-current motor of the commutator type, a source of current therefor, and means for connecting the motor armature to the source, means for impressing on the motor field a voltage substantially ninety degrees out of phase with the voltage of the source to brake the motor, and means for controlling automatically the amount and phase of the voltage impressed on the field with variation in armature current.

9. In combination, an alternating-current motor of the commutator type, a source of current therefor, and means for connecting the armature to the source, means for impressing on the field a voltage of proper magnitude and phase for producing a flow of current from said armature to said source substantially in opposition in phase to the voltage of the source.

10. In combination, an alternating-current motor of the commutator type, a source of current, means for connecting the motor armature to the source, a phase-shifting device, means for connecting the motor field in shunt to the armature through said device, and means for automatically controlling the phase of the field magnetization with variation in armature current.

11. In combination, an alternating-current motor of the commutator type, a source of current therefor, and means for connecting the motor armature to the source, means for impressing on the motor field a voltage substantially ninety degrees out of phase with the voltage of the source, and means for controlling automatically the phase of the field magnetization with variation in armature current.

12. In combination, an alternating-current motor of the commutator type, a source of current therefor, and means for connecting the armature to the source, means for impressing on the field a voltage of proper magnitude and phase for producing at the armature terminals a voltage which with the voltage of the source produces a resultant voltage substantially ninety degrees out of phase with the voltage of the source.

13. In combination, an alternating-current motor of the commutator type, a source of current therefor, means for connecting the motor armature to the source, a phase-shifting device, means for connecting the motor field in shunt to the armature through said device, and a winding in series with the armature adapted to vary the amount and phase of the field magnetization.

14. In combination, an alternating-current motor of the commutator type, a source of current therefor, a phase-shifting transformer, means for connecting the motor armature to the source, means for connecting the motor field to the source through the phase-shifting transformer, and a transformer winding in series with the armature adapted to vary the amount and phase of the voltage impressed on the field.

15. In combination, an alternating-current motor of the commutator type, a source of current therefor, means for connecting the motor armature to the source, means for impressing on the field a voltage substantially ninety degrees out of phase with the voltage of the source for braking, and a winding in series with the armature adapted to vary the amount and phase of the field magnetization.

16. In combination, an alternating-current motor of the commutator type, a source of current therefor, means for connecting the motor armature to the source, means for impressing on the field a voltage substantially ninety degrees out of phase with the voltage of the source for braking, a winding in series with the armature adapted to vary the amount and phase of the field magnetization, and manually-controlled means for controlling the field magnetization to vary the braking effect.

17. In combination, an alternating-current motor of the commutator type, a source of single-phase current, means for deriving from said source and impressing on said field for braking a voltage displaced substantially ninety degrees from the voltage of said source, and means for controlling the voltage impressed on the field.

18. In combination, an alternating-current motor of the commutator type, a source of single-phase current, means for deriving from said source and impressing on said field a voltage displaced substantially ninety degrees from the voltage of said source, and means for automatically controlling the phase of the field magnetization with variation of the armature current.

19. In combination, an alternating-current motor of the commutator type, a source of single-phase current, means for deriving from said source and impressing on said field for braking a voltage displaced substantially ninety degrees from the voltage of said source, means for automatically controlling the field magnetization with variation of the armature current, and manually-controlled means for controlling the field megnetization.

20. In combination, an alternating-current motor of the commutator type, a source of current therefor, means for connecting the motor armature to the source, means for impressing on the field a component voltage displaced in phase substantially ninety degrees from the voltage of the source, and means for impressing on the field a variable component voltage approximately in phase with the voltage of the source.

21. In combination, an alternating-current motor of the commutator type, a source of single-phase current, means for connecting the motor armature to the source, and means for deriving from the source and impressing on the motor field two component voltages, one displaced in phase substantially ninety degrees from the voltage of the source and the other variable in amount and approximately in phase with the voltage of the source.

22. In combination, an alternating-current motor of the commutator type, a source of current therefor, means for connecting the motor armature to the source, means for impressing on the field a component voltage displaced in phase substantially ninety degrees from the voltage of the source, means for impressing on the field a variable component voltage approximately in phase with the voltage of the source, and a winding in series with the armature adapted to vary the field excitation.

23. In combination, an alternating-current motor of the commutator type, a source of single-phase current, means for connecting the motor armature to the source, means for deriving from the source and impressing on the motor field two component voltages, one displaced in phase substantially ninety degrees from the voltage of the source and the other variable in amount and approximately in phase with the voltage of the source, and a winding in series with the armature adapted to vary the field excitation.

24. The combination with an alternating current distributing circuit, and a generator that supplies current thereto, of means for deriving current from the distributing circuit and supplying the same to the field magnet winding of the generator, and means for adjusting the phase of the current supplied to the distributing circuit with respect to the electromotive force of said circuit.

25. The combination with an alternating current distributing circuit, and a generator that supplies current thereto, of an exciter that supplies the field magnet winding of the generator having its field magnet winding connected to the distributing circuit, and means for adjusting the phase of the generated electromotive force with respect to the electromotive force of the distributing circuit so as to cause the current supplied to the distributing circuit to agree approximately in phase with the electromotive force of the circuit.

26. The combination with an alternating current distributing circuit, and a generator that supplies current thereto, of an exciter that supplies the field magnet winding of the generator having its field magnet winding connected to the distributing circuit, and means for adjusting the phase of the generated electromotive force with respect to the electromotive force of the distributing circuit.

27. The combination with an alternating current distributing circuit, and a generator that supplies current thereto, of means for adjusting the phase of the current in the field magnet winding of the generator to effect adjustment of the phase relations of the current supplied to the distributing circuit and the electromotive force thereof.

28. The combination with an alternating current distributing circuit, and a generator that supplies current thereto, an exciter that supplies the field magnet winding of the generator and has its field magnet winding connected to the distributing circuit, and means in circuit with the field magnet winding of the generator for adjusting the phase of the current supplied to the distributing circuit with respect to the electromotive force of the circuit.

29. The combination with an alternating current distributing circuit, a dynamo-electric machine having its armature connected thereto, and a dynamo-electric machine that supplies alternating exciting current to the aforesaid machine, of means for applying an auxiliary alternating electromotive force to the field magnet winding of one of the machines, the said electromotive force differing in phase from that applied thereto by the aforesaid means.

30. The combination with an alternating current distributing circuit, an exciter having its field magnet winding supplied therefrom, and a dynamo-electric machine having its armature connected to said circuit and its field magnet winding separately excited by the exciter, of means for applying to the field magnet winding of the dynamo-electric machine an auxiliary electromotive force that is out of phase with the electromotive force of the exciter.

In witness whereof, I have hereunto set my hand this 2nd day of June, 1906.

ERNST F. W. ALEXANDERSON.

Witnesses:
 HELEN ORFORD,
 G. C. HOLLISTER.